US011698672B2

United States Patent
Schirmer et al.

(10) Patent No.: US 11,698,672 B2
(45) Date of Patent: Jul. 11, 2023

(54) SELECTIVE DEACTIVATION OF PROCESSING UNITS FOR ARTIFICIAL NEURAL NETWORKS

(71) Applicant: Robert Bosch GmbH, Stuttgart (DE)

(72) Inventors: Juergen Schirmer, Heidelberg (DE); Andre Guntoro, Weil der Stadt (DE); Armin Runge, Renningen (DE); Christoph Schorn, Leonberg (DE); Jaroslaw Topp, Renningen (DE); Sebastian Vogel, Schaidt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 27 days.

(21) Appl. No.: 17/052,166

(22) PCT Filed: Jun. 3, 2019

(86) PCT No.: PCT/EP2019/064307
§ 371 (c)(1),
(2) Date: Oct. 30, 2020

(87) PCT Pub. No.: WO2019/243029
PCT Pub. Date: Dec. 26, 2019

(65) Prior Publication Data
US 2021/0232208 A1   Jul. 29, 2021

(30) Foreign Application Priority Data

Jun. 19, 2018 (DE) .......................... 102018209897.2
Apr. 9, 2019 (DE) .......................... 102019205079.4

(51) Int. Cl.
*G06F 1/3287* (2019.01)
*G06F 1/3237* (2019.01)
(Continued)

(52) U.S. Cl.
CPC .......... *G06F 1/3287* (2013.01); *G06F 1/3237* (2013.01); *G06N 3/04* (2013.01); *G06N 3/063* (2013.01); *G06V 20/56* (2022.01)

(58) Field of Classification Search
CPC ...... G06F 1/3287; G06F 1/3237; G06F 1/324; G06N 3/04; G06N 3/063; G06N 3/082;
(Continued)

(56) References Cited

U.S. PATENT DOCUMENTS 10,948,966 B1 * 3/2021 Rotem ..................... G06N 3/10
2006/0095911 A1 5/2006 Uemura et al.
(Continued)

FOREIGN PATENT DOCUMENTS

GB        2552242 A       1/2018

OTHER PUBLICATIONS

International Search Report for PCT/EP2019/064307, dated Aug. 12, 2019.
Srimat Chakradhar et al., "A Dynamically Configurable Coprocessor for Convolutional Neural Networks," Proceedings of the 37th Annual International Symposium on Computer Architecture, ISCA '10, ACM Press, 2010, pp. 247-257.
(Continued)

*Primary Examiner* — Jaweed A Abbaszadeh
*Assistant Examiner* — Brian J Corcoran
(74) *Attorney, Agent, or Firm* — Norton Rose Fulbright US LLP; Gerard Messina

(57) ABSTRACT

A hardware architecture for an artificial neural network ANN. The ANN includes a consecutive series made up of an input layer, multiple processing layers, and an output layer. Each layer maps a set of input variables onto a set of output variables, and output variables of the input layer and of each processing layer are input variables of the particular layer that follows in the series. The hardware architecture includes
(Continued)

a plurality of processing units. The implementation of each layer is split among at least two of the processing units, and at least one resettable switch-off device is provided via which at least one processing unit is selectively deactivatable, independently of the input variables supplied to it, in such a way that at least one further processing unit remains activated in all layers whose implementation is contributed to by this processing unit.

11 Claims, 2 Drawing Sheets

(51) Int. Cl.
  *G06N 3/04* (2023.01)
  *G06N 3/063* (2023.01)
  *G06V 20/56* (2022.01)
(58) Field of Classification Search
  CPC ...... G06N 3/0454; G06V 20/56; G06V 10/82; Y02D 10/00
  See application file for complete search history.

(56) References Cited

U.S. PATENT DOCUMENTS

| | | | | |
|---|---|---|---|---|
| 2008/0276026 | A1* | 11/2008 | Branover | G06F 1/3203 710/260 |
| 2009/0204835 | A1* | 8/2009 | Smith | G06F 1/3287 713/323 |
| 2013/0246820 | A1* | 9/2013 | Branover | G06F 1/206 713/320 |
| 2014/0095896 | A1* | 4/2014 | Carter | G06F 1/26 713/300 |
| 2014/0368688 | A1* | 12/2014 | John Archibald | G06K 9/6218 348/222.1 |
| 2015/0033054 | A1 | 1/2015 | Armbruster et al. | |
| 2016/0379109 | A1 | 12/2016 | Chung et al. | |
| 2017/0277183 | A1 | 9/2017 | Takahashi et al. | |

OTHER PUBLICATIONS

Weizhe Hua et al., "Channel Gating Neural Networks," Cornell University Library, 2019, pp. 1-11. ARXIV:1805.12549V2.
Ji Lin et al., "Runtime Neural Pruning," Advances in Neural Information Processing Systems, vol. 31, 2017, pp. 1-11.
Lanlan Liu et al., "Dynamic Deep Neural Networks: Optimizing Accuracy-Efficiency Trade-Offs By Selective Execution," Cornell University Library, 2018, pp. 1-12. ARXIV:1701.00299V3.
"Approximate computing" in Wikipedia, the free encyclopedia, last updated Nov. 25, 2020, pp. 1-4.
Chakradhar, et al.: "Best-effort Computing: Re-thinking Parallel Sotware and Hardware", Design Automation Conference, (2010), pp. 865-870, ISSN 0738-100X.
"Power management", in Wikipedia, the free encyxlopedia, (2018), pp. 1-5, URL: https://en.wikipedia.orf/w/index.php?title=Power_mangement&oldid=845211826, [accessed on Mar. 17, 2020].
Reagen, et al.: "Minerva: Enabiling Low-Power, Highly-Accurate Deep Neural Network Acceleratios", 2016 ACM/IEEE 43rd Annual Inernational Sympsoium on Computer Archtecure (ISCA), (2016), pp. 267-278, https.//doi.prf/10.1109/ISCA.2016.32.
Schorn, et al.: "Accurate Neuron Resilience Prediction for a Flexible Reliablity Management in Neural Network Accelrators", 2018 Design, Automation Test in Europe Conferece Exhibition, Apr. 23, 2018, pp. 985-990, ISSN 1558-1101. http://doi.org./10.23919/DATE32018.8342151.
Sparsh Mittal : "A Survey of Techniques for Approximate Computing", ACM Computing Surveys, 48(4), (2016), pp. 62:1-62:33, ISSN 0360-0300. http://doi.acm.org/10.1145/2893356.
Venkataramani, et al.: "AxNN: Energy-Efficient Neuromorphic Systems Using Approximate Computing", Proceedings of the 2014 International Symposium on Low Power Electronics and Design, (2014), pp. 27-32.
Zhang, et al.: "ApproxANN: An Approximate Computing Framework for Artificial Neural Network", Design, Automation Test in Europe Conference Exhibition, (2015), pp. 701-706, ISSN1530-1591.

\* cited by examiner

SELECTIVE DEACTIVATION OF PROCESSING UNITS FOR ARTIFICIAL NEURAL NETWORKS

The present invention relates to a method for operating artificial neural networks which provides a selective and resettable deactivation of hardware components during runtime of the network, and an associated hardware architecture.

BACKGROUND INFORMATION

An artificial neural network (ANN) includes an input layer, multiple processing layers, and an output layer. Input variables are read into the ANN at the input layer, and on their way through the processing layers to the output layer are processed via a processing chain which is generally parameterized. During training of the ANN, those values of the parameters of the processing chain with which the processing chain optimally maps a set of learning values for the input variables onto an associated set of learning values for the output variables are ascertained.

The strength of ANNs lies in the fact that they are able to process in parallel a large amount of very high-dimensional data, such as high-resolution images, in that multiple physical processing units cooperate in each layer. One example of a hardware architecture for an ANN that is made up of many processing units is provided in Great Britain Patent Application No. GB 2 552 242 A. This document deals with the reduction of hardware complexity and power consumption for implementation of the ANN. For this purpose, the processing work that occurs in a layer is divided into two substeps, and the partial results obtained in each of these substeps are combined to form the final result.

SUMMARY

Within the scope of the present invention, a hardware architecture for an artificial neural network (ANN) is provided. The ANN includes a consecutive series made up of an input layer, multiple processing layers, and an output layer. Each layer maps a set of input variables onto a set of output variables. Output variables of the input layer and of each processing layer are input variables of the particular layer that follows in the series. The input variables of the input layer are at the same time also the input variables of the ANN as a whole. The output variables of the output layer are at the same time also the output variables of the ANN as a whole.

The hardware architecture includes a plurality of processing units, the implementation of each layer being divided over at least two of the processing units. Thus, for example, one half of the input variables of the layer may be supplied only to the first processing unit, and the other half of the input variables may be supplied only to the second processing unit. Likewise, for example in an output layer that makes a classification, the responsibility for certain classes, for example for recognizing certain objects or situations, may be split among the different processing units. In this way, data with very high dimensionality may be processed in parallel.

It is also possible for the same processing unit to have a share in the implementation of multiple, for example successive, layers. Thus, for example, three successive layers may be implemented using two processing units operating in parallel. An input variable of the first layer, which is supplied to one of the processing units, may then, for example, pass through all three layers within this processing unit, and may ultimately be output by this processing unit as an output variable of the third layer.

The term "processing unit" is not limited to various processing units that have to be situated on physically separate components which are put together during manufacture of the hardware architecture. Rather, for example a system made up of a plurality of processing units may be combined in the same application-specific integrated circuit (ASIC). Thus, the term "processing unit" generally refers to a unit, circuit, or assembly that contributes to the implementation of at least one layer of the ANN and is selectively deactivatable.

At least one resettable switch-off device is provided with which at least one processing unit is selectively deactivatable, independently of its supplied input variables, in such a way that at least one further processing unit remains activated in all layers whose implementation is contributed to by this processing unit.

During runtime of the ANN, a dynamic compromise is thus settable between computing accuracy on the one hand and energy consumption and heat generation in the ANN on the other hand. The majority of computations in an ANN are generally robust against errors; i.e., a certain proportion of errors in these computations only slightly impairs the quality of the output of the ANN. As the result of deactivating a processing unit, certain intermediate results are completely absent, which is to be regarded as a special case of a computing error.

The condition that at least one further processing unit remains activated in all layers whose implementation is contributed to by the deactivated processing unit ensures that the ANN as a whole continues to remain functional. If one layer of the ANN were to be completely deactivated, the processing chain of the ANN would be interrupted at this location and the ANN would no longer deliver an output.

The condition that the switch-off device is resettable ensures that the deactivation of processing units may adapt to the operating situation. For example, it may be most urgent to temporarily deactivate the particular processing units that are most severely stressed by heat at that moment, in order to increase the service life of the hardware. Likewise, how strongly the deactivation of a certain processing unit affects the final result delivered by the ANN as a whole is a function of the instantaneous operating situation. In contrast, the "pruning" approaches used thus far for removing neurons from the ANN are static: regardless of whether the neurons to be removed are specified before, during, or after the training of the ANN, this specification is binding for the entire subsequent inference operation of the ANN.

The fact that the processing unit is deactivatable independently of the input variables supplied to it may ensure, on the one hand, that the deactivation by a higher-order entity may be implemented on a compulsory basis. If, for example, the objective of the deactivation is to reduce heat stress on the processing unit, this objective possibly has the highest priority in order to avoid damage to the hardware. On the other hand, a deactivation that is independent of the input variables, with the same effect on the computing accuracy of the ANN, has a much greater potential to reduce the energy consumption of the processing unit than merely zeroing out the input variables.

The option of selectively deactivating processing units is in particular conducive to further miniaturization of the hardware architecture. Previously, the empirical observation known as "Dennard's scaling," that a reduction in the sizes of transistors in integrated circuits proportionally reduces the energy consumption, applied. For several years, the reduction in the sizes of transistors has become more prevalent in areas in which the decrease in the energy consumption is less than proportional. Depending on which specific options are available for cooling, simultaneous continuous operation of all transistors present may thus no longer be possible.

However, the selective deactivation of processing units is also meaningful when all processing units present could be operated simultaneously. Any energy savings at the same time saves on costs, and for battery-operated devices extends the battery life. In addition, for increasing the availability it may be meaningful to provide in a targeted manner more processing units than are actually needed for achieving a predefined accuracy. The excess processing units may then, for example, initially remain deactivated, to be switched on only when other processing units fail.

In one particularly advantageous embodiment of the present invention, a control unit for selectively deactivating processing units is provided. The switch-off device includes at least one switch that is actuatable by the control unit. This switch may be, for example, a transistor that is electrically switchable. However, the switch may also be, for example, a semiconductor switch or a light-sensitive resistor that is optically switchable.

In one particularly advantageous embodiment of the present invention, the switch is situated in such a way that it is able to interrupt the supplying of a clock signal and/or a supply voltage to the processing unit. The interruption of the supply voltage may completely prevent the energy consumption of the processing unit. If only the clock signal is interrupted, the majority of the customary energy consumption is still saved. At the same time, this avoids having to reinitialize the processing unit during the subsequent reactivation, so that the processing unit is then more quickly available once again.

In the control unit, the deactivation and subsequent reactivation of processing units may be made a function of arbitrary conditions. For example, a distribution of the omitted computations may be predefined. Thus, for example, the computation of each Nth neuron, where N is a natural number, may be omitted. However, instead of such a homogeneous distribution, the deactivations may take place based on an estimate of the importance of the individual computing results with respect to the design time of the ANN. Computations with low relevance are then preferably switched off. Tests have shown that the impairment of output quality of the ANN in this case is less than in the case of homogeneous distribution.

In one particularly advantageous embodiment of the present invention, the control unit obtains as input at least one output variable that comes from at least one processing unit, a measure for the switching activity of at least one processing unit, a measure for the energy consumption of at least one processing unit, and/or a measure for the temperature of at least one processing unit.

It is thus possible, for example, to temporally and/or spatially equalize the demands on multiple processing units that contribute to the implementation of a given layer of the ANN. Aging processes of the hardware may thus be reduced. These aging processes in particular are a function of the temperature. Thus, for example, the electronic properties of semiconductors are progressively impaired by interdiffusion between adjacent areas with different doping, the speed of this interdiffusion being an exponential function of the temperature.

The temperature of the processing unit may be arbitrarily determined. Apart from a temperature sensor, a thermal imaging camera that is able to simultaneously detect the temperature of multiple processing units in real time is in particular also suited for this purpose. Another cost-effective option is an indirect determination of the temperature via the switching activity. For this purpose, the switching activity is measured over a certain time period, and a model is used which on this basis predicts the expected temperature of the processing unit.

On the other hand, the selective switching off of processing units is not necessarily dependent on the presence of a control unit. In one further advantageous embodiment of the present invention, at least one processing unit contains a switch-off device that automatically deactivates the processing unit when a first condition for the temperature of the processing unit, and/or for the change of this temperature over time, and/or for the change in the switching activity of the processing unit over time, is met, and automatically reactivates the processing unit when a second condition for the temperature of the processing unit, and/or for the change of this temperature over time, and/or for the change in the switching activity of the processing unit over time, is met. In particular an outlay for wiring to the central control unit may then be saved. The ANN then develops momentum with regard to the distribution of the overall processing work performed, which depends, among other things, on how heavy the demand is on specific processing units.

Moreover, the present invention relates to a method for operating an artificial neural network (ANN). The ANN includes a consecutive series made up of an input layer, multiple processing layers, and an output layer. Each layer maps a set of input variables onto a set of output variables. Output variables of the input layer and of each processing layer are input variables of the particular layer that follows in the series. The input variables of the input layer are at the same time also the input variables of the ANN as a whole. The output variables of the output layer are at the same time also the output variables of the ANN as a whole.

The ANN is implemented in a plurality of processing units in such a way that the implementation of each layer is divided over at least two of the processing units.

In accordance with an example embodiment of the present invention, when a predefined deactivating condition is met, during operation of the ANN at least one processing unit is selectively deactivated, independently of the input variables supplied to it, in such a way that at least one further processing unit remains activated in all layers whose implementation is contributed to by this processing unit. The deactivated processing unit is reactivated during operation of the ANN when a predefined activating condition is met.

Analogously to the above description of the hardware architecture, during runtime of the ANN a dynamic compromise is thus achieved between computing accuracy on the one hand and energy consumption as well as heat generation in the ANN on the other hand.

In one particularly advantageous embodiment of the present invention, the deactivating condition and/or the activating condition involve(s) a measure for the quality of at least one input variable, a measure for the temporal and/or spatial rate of change of at least one input variable, a measure for a quality requirement for at least one output variable, and/or a measure for a relevance of at least one output variable.

For example, if a high quality of the input data representing the input variables of the ANN is specified, with the same output quality a greater number of errors due to deactivating internal computing steps of the ANN may be tolerated when the quality of the input data is poor, since it may be expected that the output quality of the ANN has a higher base level when the quality of the input data is high. For example, a good signal-to-noise ratio of a camera image based on good light conditions may be regarded as an indication of high quality of the input data.

The quality requirement for output variables may be a function, for example, of whether further information sources are available for the objective underlying the output variables. If the uncertainty in the output of the ANN may be compensated for by additional information sources, more processing units may be deactivated. Such redundant information sources may be, for example, further different sensor data processing systems. Likewise, in the event of failure of information sources, the output quality of the ANN may once again be increased by reactivating the previously deactivated processing units.

The quality requirement for output variables may also be a function, for example, of the extent to which events from previous time increments or also other pieces of context information are present. If the ANN processes, for example, a temporally or spatially contiguous stream of input data (a video data sequence, for example), information from the temporal or spatial vicinity of the piece of input data to be processed at that moment may be utilized to dynamically adapt the deactivation of processing units in certain portions of the network. If, for example, the ANN tracks an object in a video sequence, certain portions in the neural network are relevant for this purpose, while other portions make no contribution at that moment. The relevant computing steps are determined by the properties of the tracked object (features) as well as the position of the object in the image.

If the features and position of the object have been determined by the ANN in time increment t, this information may be utilized in the subsequent time increment to deactivate more processing units in portions of the network which at that moment are processing irrelevant features or which are responsible for regions of the input image that are irrelevant at that moment. For the neurons that are irrelevant at that moment, it may be assumed that their output value is small or zero anyway, so that no major error in the output of the ANN results from switching off the processing units in question. The method may be assisted by a movement prediction for the image information (for example, by determining the optical flow).

The relevance of individual computing results within a neural network may be estimated with the aid of various methods.

One option, for example, is to simulate the switching off of certain processing units in the ANN for a set of training data and to measure the effect on the output quality of the network. The simulations may take place either on the actual hardware or in a virtual prototype of the hardware, or in a pure software simulation environment. If a large reduction in the output quality over the training data distribution is determined when certain computing steps are deactivated, these computations have great relevance for these training data.

The changes in the output values of the ANN when certain computing steps are omitted may also be ascertained analytically, for example. For this purpose, for example the gradients of the output values with regard to the intermediate results may be computed, or a decomposition of the output function of the neural network into the contributions of individual intermediate results may be carried out.

In both examples of approaches, it is possible to determine global relevance, i.e., relevance that results over a complete (training) input data distribution, as well as relevance of certain groups of input data. Thus, for example, images that represent identical or similar objects, or images in which the relevant object is situated in a certain region, may be combined in order to determine separate relevance values for these groups. This information may then be used to preferably deactivate certain portions of the ANN in a given context.

In one further particularly advantageous embodiment of the present invention, the deactivating condition and/or the activating condition involve(s) the temperature of at least one processing unit and/or the temperature of at least one heat sink that is coupled to this processing unit, and/or the change in the switching activity of this processing unit over time.

According to the above description, in particular aging processes of the hardware may be equalized in this way. In addition, for example the heat capacity of a heat sink may be utilized to call up the power of more processing units for a short-term increased demand.

In one further particularly advantageous embodiment of the present invention, the ANN is used to recognize objects and/or situations based on input variables. Based on a piece of context information, it is ascertained that the presence of a first subset of the objects and/or situations is more unlikely than the presence of a second subset of the objects and/or situations. This context information may originate from an arbitrary source. Apart from an external source, as an alternative or in combination it is suitable in particular to ascertain the context information from the change in the input variables themselves over time. The deactivation of processing units that are used primarily to recognize objects and/or situations from the first subset is then preferred over the deactivation of processing units that are used primarily to recognize objects and/or situations from the second subset.

In this way, the energy used in the ANN may be focused on recognizing those objects and/or situations whose presence is more likely. In particular, systems for recognizing objects and/or situations in the surroundings of vehicles, for example for at least partially automated driving, are designed for recognizing a very large number of objects or situations. For example, an at least partially automatedly driving vehicle must be able to respond to all traffic signs that apply at that moment in order to drive in compliance with regulations. However, it is not expected that at any time, all possible traffic signs and situations will likewise occur. Thus, for example, there are no traffic lights, crosswalks, or railroad crossings on expressways. Likewise, far away from bodies of water, a warning sign that the road is leading to a water's edge is not expected. The processing units responsible for recognizing such unlikely objects or situations may thus preferably be deactivated without an adverse effect on operational safety of the vehicle.

Thus, in one particularly advantageous embodiment the ANN is used to recognize objects and/or situations in the surroundings of a vehicle, the additional context information including the position of the vehicle and/or the road category of a road being traveled on by the vehicle at that moment.

A deactivation of processing units that is controlled based on this context information guides the nondeterminism, which the deactivation necessarily introduces into the ANN, in ordered paths. In particular with regard to the authorization for public road traffic, it may be made plausible that the savings of energy and waste heat effectuated with the deactivation of processing units is obtained without increased risk.

If the ANN provides the option to selectively deactivate processing units using hardware, the method may be completely or partially carried out with software control. The software in question may then be sold, for example, as an update or upgrade to an existing control unit, and in this regard is a stand-alone product. Therefore, the present invention further relates to a computer program that includes machine-readable instructions which when executed on a computer and/or on a control unit prompt the computer and/or the control unit to carry out the example method provided by the present invention.

Moreover, the present invention relates to a machine-readable data medium or a download product that includes the computer program.

Further measures that enhance the present invention are illustrated in greater detail below with reference to figures, together with the description of the preferred exemplary embodiments of the present invention.

DETAILED DESCRIPTION OF EXAMPLE EMBODIMENTS

Figure 1:
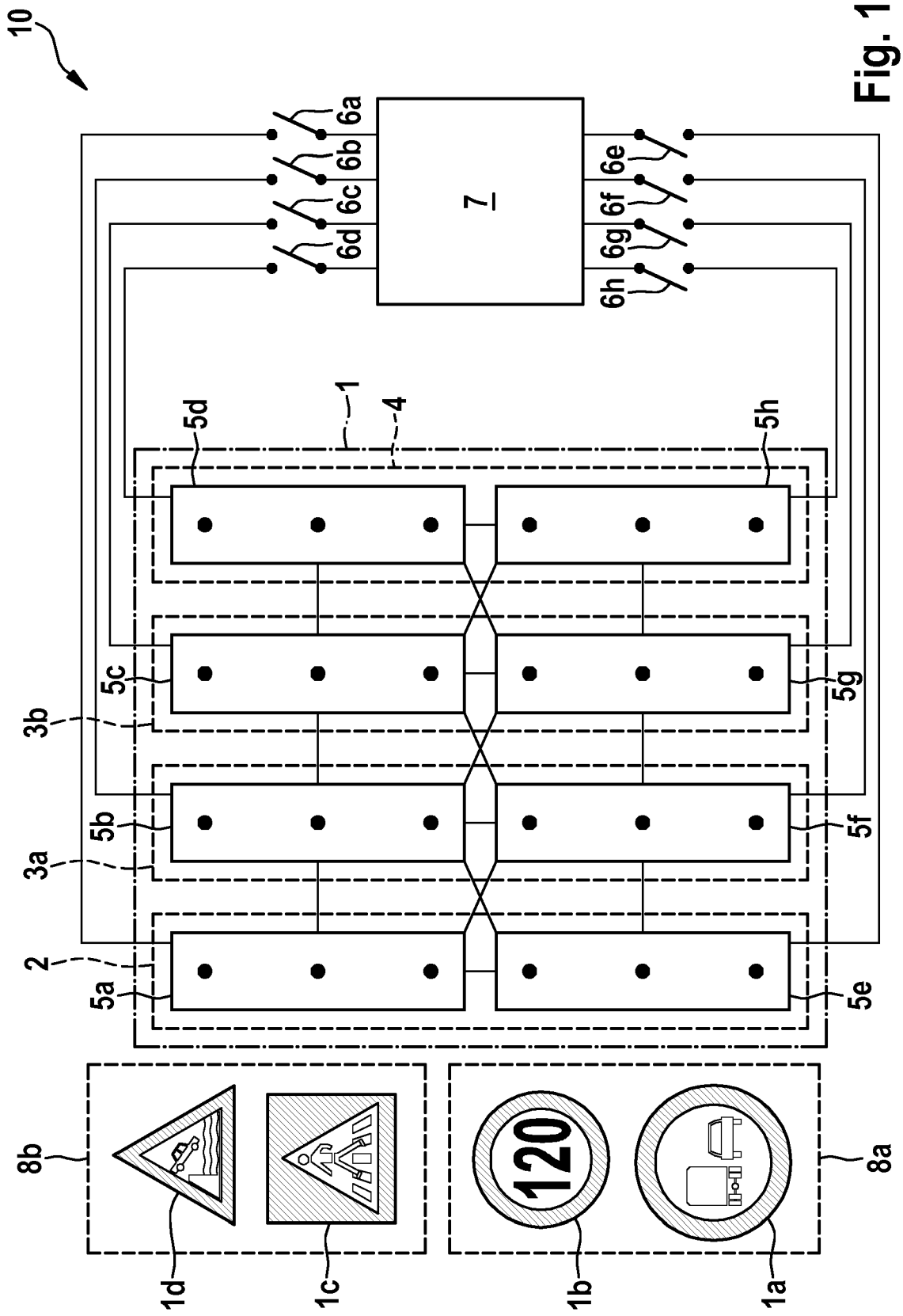
FIG. 1 shows one exemplary embodiment of hardware architecture 10 for an ANN 1 in accordance with an example embodiment of the present invention.

According to FIG. 1, ANN 1, depicted by way of example in a simplified manner, includes an input layer 2, two processing layers 3a and 3b, and an output layer 4. Hardware architecture 10 implements this ANN 1 with the aid of eight processing units 5a through 5h, which are connected to one another. Each processing unit 5a through 5h implements three neurons, illustrated as solid dots. In each case two of processing units 5a through 5h contribute to the implementation of each of layers 2, 3a, 3b, 4.

A switch-off device 6a through 6h, designed as a switch in the supplying of a supply voltage and/or a clock signal, is associated with each of processing units 5a through 5h; the particular processing unit may be taken out of operation via the switch-off device. All switch-off devices 6a through 6h are controlled via a central control unit 7.

The ANN is designed for recognizing objects in the surroundings of a vehicle. Only four traffic signs, as examples of objects 1a through 1d, are depicted in FIG. 1. In one example of a driving situation on the expressway, the presence of a traffic sign from a first subset 8a, in the present case no passing by trucks 1a or a speed limit 1b, is possible. In contrast, a traffic sign from a second subset 8b, in the present case a pedestrian crossing sign 1c or a hazard sign 1d to warn of a water's edge, does not typically appear on an expressway. Processing units that are responsible essentially for recognizing these traffic signs 1c, 1d may therefore be deactivated when traveling on the expressway, without a loss in traffic safety.

Figure 2:
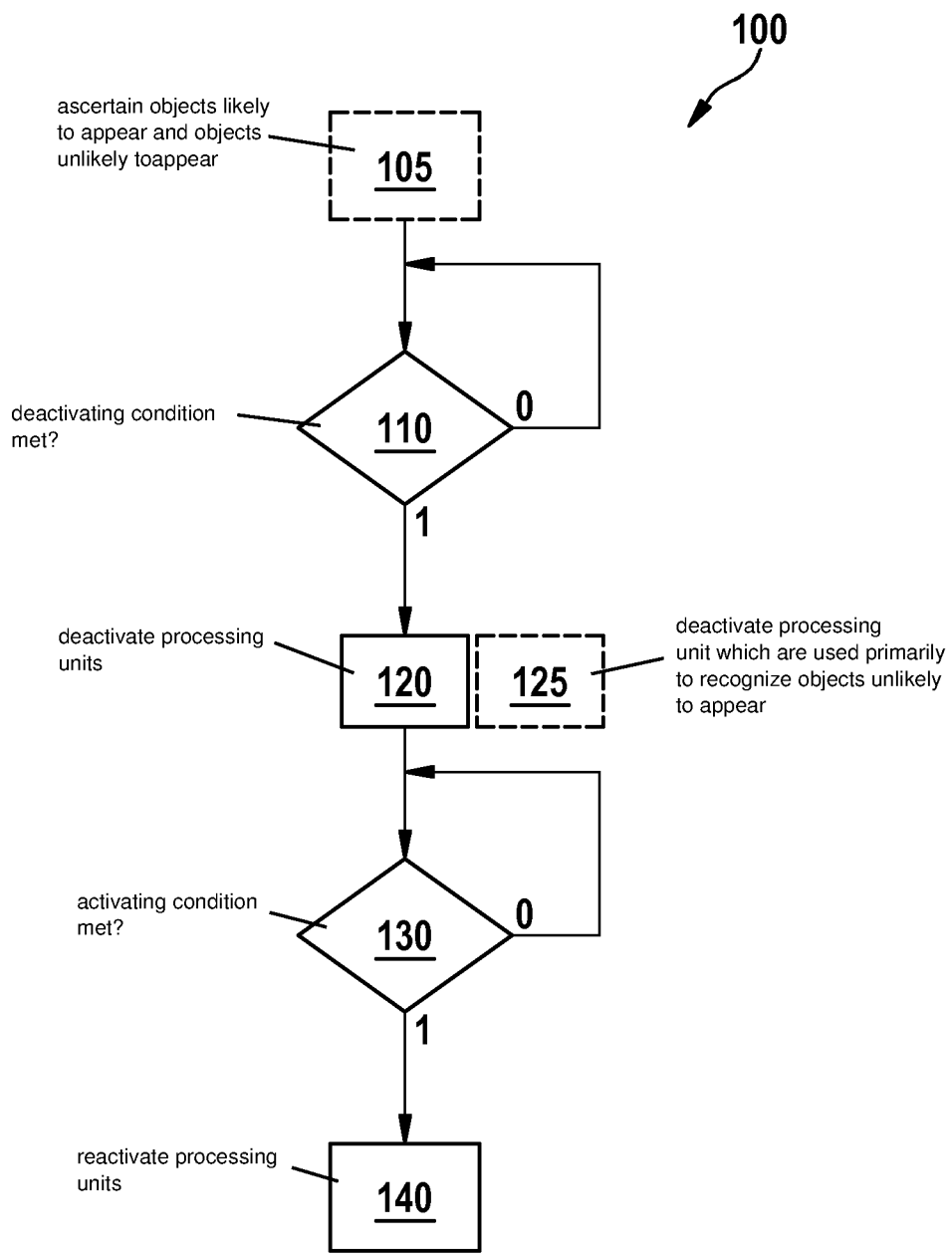
FIG. 2 shows one exemplary embodiment of method 100 in accordance with the present invention.

FIG. 2 shows one exemplary embodiment of method 100. According to optional step 105, subset 8a of objects 1a, 1b that are rather likely to appear and subset 8b of objects 1c, 1d that are rather unlikely to appear are ascertained based on an additional piece of context information, for example the road category of the road being traveled on at that moment. According to step 110, a check is continuously made as to whether the deactivating condition is met. If this is the case (truth value 1), processing units 5a through 5h are deactivated in step 120. If subset 8b of objects 1c, 1d that are rather unlikely to appear has been ascertained in step 105, the deactivation of processing units 5a through 5h, which are used primarily to recognize objects 1c, 1d from subset 8b, is preferred according to step 125.

According to step 130, a check is continuously made as to whether an activating condition for reactivating previously deactivated processing units 5a through 5h is met. If this is the case (truth value 1), these processing units 5a through 5h are reactivated in step 140.

What is claimed is:

1. A hardware architecture for an artificial neural network (ANN), the ANN including a consecutive series of layers, each of the layers mapping its input variables onto output variables, and each of the output variables of the layers being input variables of a particular layer that follows in the series, the hardware architecture comprising:
   a plurality of processing units, an implementation of each of the layers being split among at least two of the processing units; and
   at least one resettable switch-off device that is configured to selectively deactivate at least one of the processing units, independently of the input variables supplied to the at least one of the processing units, so that at least one further one of the processing units remains activated in all layers of the consecutive series of layers whose implementation is contributed to by the at least one of the processing units, wherein:
   the layers map the input variables onto the output variables using a plurality of neurons, in the split of the implementation, computation of the plurality of neurons being split among at least two of the processing units,
   at least one of the at least two of the processing units has a share in the implementation of multiple layers of the consecutive layers, and
   by selectively deactivating the at least one of the processing units, the resettable switch-off device deactivates a subset of the plurality of neurons associated with the at least one of the processing units.

2. The hardware architecture as recited in claim 1, wherein a control unit configured to selectively deactivate the processing units is provided, and wherein the switch-off device includes at least one switch that is actuatable by the control unit.

3. The hardware architecture as recited in claim 2, wherein the switch is situated in such a way that it is able to interrupt a supply of a clock signal to the at least one of the processing units and/or a supply voltage to the at least one of the processing units.

4. The hardware architecture as recited in claim 2, wherein the control unit is configured to obtain as input at least one output variable that comes from the at least one of the processing units; (i) a measure for a switching activity of the at least one of the processing units, and/or (ii) a measure for an energy consumption of the at least one of the processing units, and/or (iii) a measure for a temperature of the at least one of the processing units.

5. The hardware architecture as recited in claim 1, wherein the at least one of the processing units contains a switch-off device that automatically deactivates the at least one of the processing units when a first condition: (i) for a temperature of the at least one of the processing units, and/or (ii) for a change of the temperature over time of the at least one of the processing units, and/or (iii) for a change in switching activity of the at least one processing unit over time, is met, and automatically reactivates the at least one of the processing units when a second condition: (i) for the temperature of the at least one of the processing units, and/or (ii) for the change of the temperature over time of the at least one of the processing units, and/or (iii) for the change in the switching activity of the processing unit over time, is met.

6. A method for operating an artificial neural network (ANN), the ANN including a consecutive series of layers, each of the layers mapping its input variables onto output variables, and, in each case the output variables of the layers are input variables of a particular layer that follows in the series, the ANN being implemented in a plurality of processing units in such a way that an implementation of each of the layers is split among at least two of the processing units, the method comprising the following steps:

when a predefined deactivating condition is met during operation of the ANN independently of input variables supplied to it, at least one of the processing units is selectively deactivated in such a way that at least one further one of the processing units remains activated in all layers whose implementation is contributed to by the at least one of the processing units; and reactivating the at least one deactivated processing unit during operation of the ANN when a predefined activating condition is met, wherein:

the layers map the input variables onto the output variables using a plurality of neurons, in the split of the implementation, computation of the plurality of neurons being split among at least two of the processing units, at least one of the at least two of the processing units has a share in the implementation of multiple layers of the consecutive layers, and by selectively deactivating the at least one of the processing units, the resettable switch-off device deactivates a subset of the plurality of neurons associated with the at least one of the processing units.

7. The method as recited in claim 6, wherein the deactivating condition and/or the activating condition involves: (i) a measure for a quality of at least one input variable, and/or (ii) a measure for a temporal and/or spatial rate of change of at least one input variable, and/or (iii) a measure for a quality requirement for at least one output variable, and/or (iv) a measure for a relevance of at least one output variable.

8. The method as recited in claim 6, wherein the deactivating condition and/or the activating condition involve(s): (i) a temperature of the at least one processing units, and/or (ii) a temperature of at least one heat sink that is coupled to the at least one of the processing units, and/or (iii) a change in switching activity of the at least one of the processing units over time.

9. The method as recited in claim 6, wherein the ANN is used to recognize objects and/or situations based on input variables, and, based on a piece of context information, it is ascertained that a presence of a first subset of the objects and/or situations is more unlikely than a presence of a second subset of the objects and/or situations, and wherein, in the deactivation, deactivating those processing units that are used primarily to recognize objects and/or situations from the first subset is preferred over deactivating of those of the processing units that are used primarily to recognize objects and/or situations from the second subset.

10. The method as recited in claim 9, wherein the ANN is used to recognize objects and/or situations in surroundings of a vehicle, and the piece of context information includes a position of the vehicle and/or a road category of a road being traveled on by the vehicle at that moment.

11. A non-transitory machine-readable storage device on which is stored a computer program that includes machine-readable instructions for operating an artificial neural network (ANN), the ANN including a consecutive series of layers, each of the layers mapping its input variables onto output variables, and, in each case the output variables of the layers are input variables of a particular layer that follows in the series, the ANN being implemented in a plurality of processing units in such a way that an implementation of each of the layers is split among at least two of the processing units, the computer program, when executed by a computer, causing the computer to perform the following steps:

when a predefined deactivating condition is met during operation of the ANN independently of input variables supplied to it, at least one of the processing units is selectively deactivated in such a way that at least one further one of the processing units remains activated in all layers whose implementation is contributed to by the at least one of the processing units; and reactivating the at least one deactivated processing unit during operation of the ANN when a predefined activating condition is met, wherein:

the layers map the input variables onto the output variables using a plurality of neurons, in the split of the implementation, computation of the plurality of neurons being split among at least two of the processing units, at least one of the at least two of the processing units has a share in the implementation of multiple layers of the consecutive layers, and by selectively deactivating the at least one of the processing units, the resettable switch-off device deactivates a subset of the plurality of neurons associated with the at least one of the processing units.

* * * * *